United States Patent [19]

Kitagawa et al.

[11] Patent Number: 4,857,089
[45] Date of Patent: Aug. 15, 1989

[54] CERAMIC HONEYCOMB FILTER FOR PURIFYING EXHAUST GASES

[75] Inventors: Jun Kitagawa; Toshihiko Hijikata; Kazuo Ishikawa, all of Nagoya, Japan

[73] Assignee: NGK Insulators, Ltd., Nagoya, Japan

[21] Appl. No.: 147,997

[22] Filed: Jan. 25, 1988

[30] Foreign Application Priority Data

Jan. 28, 1987 [JP] Japan ................................ 62-16124

[51] Int. Cl.⁴ ............................................. B01D 46/00
[52] U.S. Cl. ................................ 55/523; 55/DIG. 30; 60/311; 422/180
[58] Field of Search .................. 55/523, 487, 486; 60/311; 422/180

[56] References Cited

U.S. PATENT DOCUMENTS

| | | | |
|---|---|---|---|
| 4,340,403 | 7/1982 | Higuchi et al. | 55/523 |
| 4,364,760 | 12/1982 | Berg et al. | 55/523 |
| 4,364,761 | 12/1982 | Berg et al. | 55/523 |
| 4,390,355 | 6/1983 | Hammond, Jr. et al. | 55/523 |
| 4,404,007 | 9/1983 | Tukao et al. | 55/523 |

FOREIGN PATENT DOCUMENTS 0205755 12/1986 European Pat. Off. .
148607 11/1980 Japan ........................... 55/DIG. 30
237109 10/1985 Japan ................................ 55/523
57223 3/1986 Japan ................................ 55/523
252820 11/1986 Japan ................................ 55/523

OTHER PUBLICATIONS

Patent Abstracts of Japan, vol. 11, No. 196 (JP-A-62 20 613).
Patent Abstracts of Japan, vol. 6, No. 33 (JP-A-56 148 607).

Primary Examiner—Bernard Nozick
Attorney, Agent, or Firm—Arnold, White & Durkee

[57] ABSTRACT

A ceramic honeycomb filter for purifying exhaust gases from combustion engines includes a ceramic honeycomb structure formed by extruding and having a number of through-passages alternately closed at their ends by ceramic closure members. The through-passages formed by partition walls for capturing fine particles in the exhaust gases accumulated on the partition walls. The ceramic honeycomb filter comprises porous ceramic layers provided on the partition walls over a distance of 1/10-8/10 of an effective length of the filter from outlet ends of said through-passages for the exhaust gases.

2 Claims, 2 Drawing Sheets

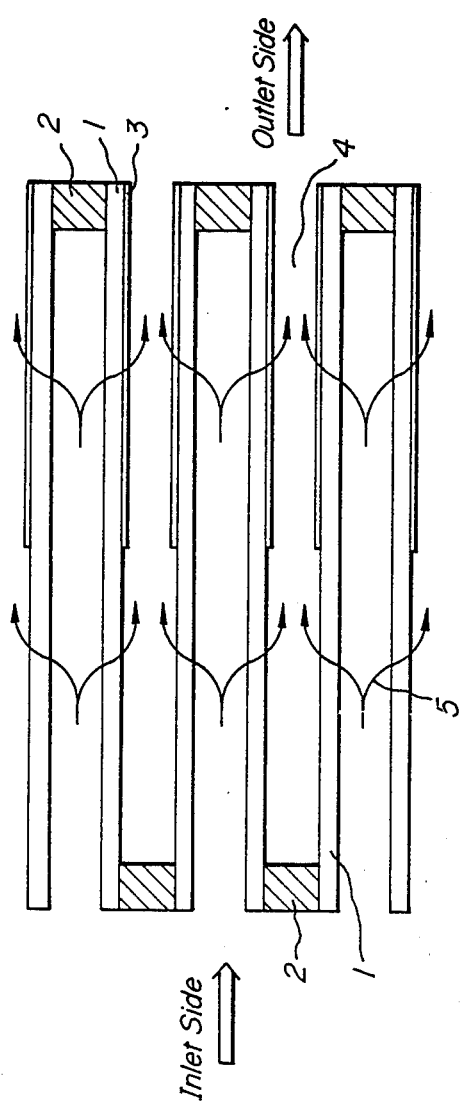

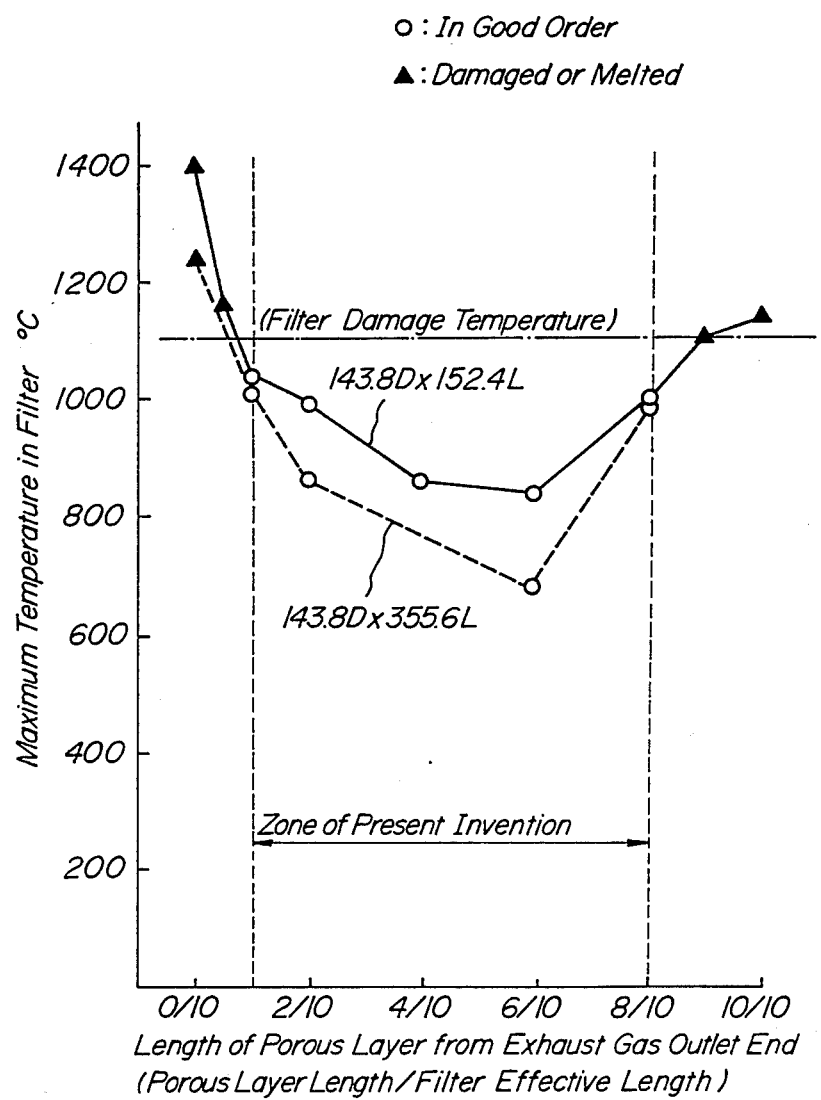
FIG_2

CERAMIC HONEYCOMB FILTER FOR PURIFYING EXHAUST GASES

BACKGROUND OF THE INVENTION

This invention relates to a filter for capturing fine particles consisting mainly of carbon in exhaust gases exhausted from combustion engines such as diesel engines and burning the particles to purify the exhaust gases.

A filter for purifying exhaust gases from combustion engines such as diesel engines by removing fine particles consisting mainly of carbon included in the exhaust gases has been known as disclosed, for example, in U.S. Pat. No. 4,364,761 comprising a ceramic honeycomb structure having alternately closed through-apertures. In such a filter, as the fine particles are accumulated in partition walls of the honeycomb structure, pressure losses become large to lower engine performance. Therefore, it is necessary to burn the accumulated fine particles so as to recover the filtering performance.

In conventional honeycomb structures, the partition walls thereof for filtering are usually formed by extruding so that the thicknesses of the walls, diameters of pores and porosity of the walls are substantially uniform throughout the structure. The fine particles are therefore accumulated uniformly form inlets to outlets of the partition walls of the honeycomb structures or increasing at the outlet ends.

When the particles are burned to recover the filter, the fine particle layers are progressively burned from the inlet side to the outlet side to restore the filter. In the conventional honeycomb filters adapted to accumulate fine particles thereon, burning heat produced on the inlet side transmits to the outlet side, and further, the temperature of partition walls on the outlet side rapidly rises because of the burning heat of the fine particles on the outlet sides, so that the ceramic filter may melt or cracks may ultimately occur due to thermal shock in such a rapid temperature rise.

In order to eliminate such a disadvantage, porous ceramic homeycomb structures are so formed by a corrugate method that the porosity of paritition walls decreases from the inlet side to the outlet side as disclosed in Japanese Patent Application Laid-open No. 61-129,017. In order to produce such filters having the uneven porosity, however, ceramic green sheets having different porosities must be prepared. What is worse still, such ceramic green sheets of the different porosities make the production of honeycomb structures difficult due to different contraction rates dependent upon their porosities when formed green sheets are fired.

Moreover, in order to produce filters having various porosities, various ceramic green sheets must be prepared because the porosities are determined by ceramic green sheets.

SUMMARY OF THE INVENTION

It is a primary object of the invention to provide a ceramic honeycomb filter which eliminates the above described disadvantages of the prior art and which is easily manufactured and can be recovered by burning without any melting and damage of the filter.

In order to achieve this object, the present invention includes a ceramic honeycomb filter for purifying exhaust gases wherein the filter includes a ceramic honeycomb structure formed by extruding and having a number of through-passages alternately closed at their ends by ceramic closure members. These through-passages are formed by partition walls utilized for capturing fine particles in exhaust gases accumulated on the partition walls. The ceramic honeycomb filter according to the invention further comprises porous ceramic layers provided on the partition walls over a distance of 1/10-8/10 of an effective length of the filter from outlet ends of the through-passages for the exhaust gases.

With the above arrangement, the portions of the partition walls provided with the porous ceramic layers become thicker to restrict flows of the exhaust gases passing therethrough so that amounts of fine particles or soot to accumulate thereon will decrease. As a result, when burning the accumulated soot for recovering the filter, heat produced in the partition walls will decrease so that the temperature of the partition walls on the side of the outlet ends becomes lower in conjunction with absorption of the heat in burning the soot by a heat capacity of the porous ceramic layers, thereby preventing any melt and damage of the filter.

Moreover, filters having various porosities can be manufactured simply by coating the porous ceramic layers on the partition walls of the ceramic honeycomb structure formed by extruding according to the invention.

If the porous ceramic layers are made as a catalyst auxiliary carrier of γ-alumina to carry a catalyst such as platinum, carbon monoxide, hydrocarbon and nitrogen oxide in the exhaust gases can be decomposed in addition to the removal of the fine particles in the exhaust gases.

The portions of partition walls provided with the porous ceramic layers over the distance of 1/10-8/10 of the effective length of the filter from the outlet ends of the through-passages corresponds to zones of the partition walls whose temperature heated by the heat produced in burning the acumulated fine particles becomes approximately more than 700° C. when the filter is not provided with porous ceramic layers. Therefore, the length of the porous ceramic layers should be determined dependently upon a diameter and a length of the ceramic honeycomb filter and a cell density. However, the porous ceramic layers having a length within the range above described bring about the effects of the invention.

In order that the invention may be more clearly understood, preferred embodiments will be described, by way of example, with reference to the accompanying drawings.

BRIEF DESCRIPTION OF THE DRAWINGS

FIG. 1 is a sectional view for explaining one embodiment of the ceramic honeycomb filter for purifying exhaust gases according to the invention; and FIG. 2 is a graph illustrating relations between lengths of porous ceramic layers and maximum temperatures in filters.

DESCRIPTION OF THE PREFERRED EMBODIMENTS

FIG. 1 is a sectional view for explaining one embodiment of the ceramic honeycomb structure for purifying exhaust gases according to the invention. The ceramic honeycomb structure shown in FIG. 1 comprises partition walls 1 forming through-passages 4, closure members 2 for closing ends of the through-passages 4, and porous ceramic layers 3. Arrows 5 denote flows of exhaust gases. In this embodiment, the porous ceramic layers 3 are provided on the partition walls over one half of filter effective lengths on the side of outlets of the exhaust gases. A term of "effective length of the ceramic honeycomb filter" used herein is intended to mean the effective filter length of the partition walls 1 except the closure members 2.

As the ceramic honeycomb constructions used herein, those formed by extruding are preferably used in view of their uniform shapes, diameters of pores, porosities and productivity. Cordierite is preferable as a material of the ceramic honeycomb structure in view of thermal shock-resistance and porosity. Moreover, the through-apertures 4 are preferably hexagonal, square, circular or the like in section. The numbers of the through-apertures are preferably those within a range of 7.7–46.5 cells/cm$^2$ (50–300 CPI$^2$) in cell density. Further, thicknesses of the partition walls are preferably 0.25–0.76 mm (10–30 mil).

The closure members 2 are formed by closing predetermined ends of the through-passages of the formed and fired honeycomb structure. The material of the closure members are preferably the same as that of the ceramic honeycomb structure.

The porous ceramic layers 3 are provided on the partition walls 1 on either or both the inlet and outlet sides over the predetermined length above described from the ends on the outlet side. The porous ceramic layers 3 may also be used as catalyst auxiliary carriers. In this case, the catalyst auxiliary carriers are made or γ-alumina or the like to carry a catalyst such as platinum so as to form catalyst carrier layers. With this arrangement, the exhaust gases including fine particles can be purified, while carbon monoxide, hydrocarbon and nitrogen oxide can be oxidized or reduced. Moreover, accumulated soot can be continuously burned by lowering the ignition point of the soot.

The material of the porous ceramic layers 3 is preferably a ceramic material in view of heat-resistance and a predetermined porosity and more preferably the same material as the partition walls so as to prevent a difference in heat expansion coefficient.

The thickness of the porous ceramic layers 3 can be selected depending upon the thickness and porosity of the partition walls and the material and porosity of the porous ceramic layers 3. The thickness of the porous ceramic layers 3 may be uniform or progressively increased from the inlet side to the outlet side for exhaust gases. However, the porous ceramic layers 3 may be comparatively thick in order to prevent the temperature rise of the partition walls due to the burning heat of the fine particles. For example, with a honeycomb structure made of cordierite having a 143.8 mm (5.66 inch) diameter, a 152.4 mm (6 inch) length, 50% porosity, 31 cells/cm$^2$ (200 CPI$^2$) cell density and 0.3 mm (12 mil) partition wall thickness, porous ceramic layers 3 of 400 g are provided on the outlet side over 8/10 of the effective length of the filter to obtain the required effect.

EXAMPLE

Honeycomb structures made of cordierite having two kinds of shapes as shown in Table 1 were prepared to produce samples Nos. 1–10 and reference examples Nos. 11–13 having porous ceramic layers of the material, lengths and weights as shown in Table 1, and prior art examples Nos. 14 and 15 having no porous ceramic layers. The obtained filters were provided on a diesel engine. Fine particles (soot) mainly consisting of carbon were accumulated on partition walls of the samples, accumulated amounts being shown in Table 1. Thereafter, fine particles on inlet sides of the exhaust gases were burned by a burner to measure the maximum temperatures in the respective filters and to inspect damaged conditions of the filters after burning the soot, results of which are shown in Table 1. FIG. 2 illustrates relations between ratios of lengths of the porous layers from outlet ends to filter effective lengths and the maximum temperatures in the filters.

TABLE 1

| | Filter | | | | Porous layer | | | | | |
| | | Cell structure | | | Dimension* | | | | Maximum | |
| | Shape (mm) | | | | Ratio to | | | Amount | temper- | Damaged |
| Sample No. | Diameter | Total length | Thickness of wall (mm) | Density (cell/cm$^2$) | Material | filter effective length | Length (mm) | Weight (g/cm$^3$) | of accumulated soot (g) | ature in filter (°C.) | condition of filter |
| --- | --- | --- | --- | --- | --- | --- | --- | --- | --- | --- | --- |
| Present invention | | | | | | | | | | | |
| 1 | 143.8 | 152.4 | 0.3 | 31 | Cordierite | 1/10 | 13 | 0.14 | 20 | 1040 | in good order |
| 2 | " | " | " | " | " | 2/10 | 26 | " | " | 990 | " |
| 3 | " | " | " | " | " | 4/10 | 52 | " | " | 860 | " |
| 4 | " | " | " | " | " | 6/10 | 79 | " | " | 840 | " |
| 5 | " | " | " | " | " | 8/10 | 106 | " | " | 1000 | " |
| 6 | " | 355.6 | 0.4 | 15 | " | 1/10 | 34 | " | " | 1010 | in good order |
| 7 | " | " | " | " | " | 2/10 | 67 | " | " | 860 | " |
| 8 | " | " | " | " | " | 6/10 | 201 | " | " | 680 | " |
| 9 | " | " | " | " | " | 8/10 | 268 | " | " | 990 | " |
| 10 | " | 152.4 | 0.3 | 31 | γ-alumina | 6/10 | 79 | " | " | 850 | " |
| Reference example | | | | | | | | | | | |
| 11 | " | " | " | " | Cordierite | 0.5/10 | 7 | " | " | 1160 | damaged |
| 12 | " | " | " | " | " | 9/10 | 119 | " | " | 1110 | " |
| 13 | " | " | " | " | " | 10/10 | 132 | " | " | 1140 | " |
| 14 | " | " | " | " | Cordierite | 0 | 0 | 0 | " | 1400 | melted |
| 15 | " | 355.6 | 0.4 | 15 | " | 0 | 0 | 0 | " | 1240 | damaged |

*The dimensions of porous layers do not include sealed portions.

As can be seen from Table 1 and FIG. 2, the maximum temperatures in the filters Nos. 1–10 provided with the porous ceramic layers having ratios 1/10–8/10 to filter effective lengths are lower than those of the filters Nos. 14 and 15 having no porous ceramic layers. As a result, the filters Nos. 1–10 do not give rise to any damage and melt. With the filter No. 13 provided with the porous ceramic layer over the entire effective length of the filter, fine particles are uniformly accumulated in the filter so that the filter is likely to be damaged although the maximum temperature in the filter is lower than those in the filter No. 14 having no porous ceramic layer. Moreover, even with the filter No. 10 having the porous ceramic layers of γ-alumina serving also as catalyst auxiliary carriers, the maximum temperature is lower to eliminate the risk of damage.

As can be seen from the above explanation, the ceramic honeycomb filter according to the invention can prevent any damage and melt in burning fine particles, accumulated in the filter, for recovering the filter by providing porous ceramic layers on partition walls over a predetermined distance from an exhaust gas outlet end of the filter.

It is further understood by those skilled in the art that the foregoing description is that of preferred embodiments of the disclosed filters and that various changes and modifications may be made in the invention without departing from the spirit and scope thereof.

What is claimed is:

1. A ceramic honeycomb filter for purifying exhaust gases, comprising:
   an extruded cordierite ceramic honeycomb structure having an inlet side, an outlet side, and a plurality of longitudinal, intersecting partition walls extending from said inlet side towards said outlet side and defining a plurality of adjacent, longitudinal through-passages;
   a plurality of ceramic closure members located in alternate ends of said longitudinal through-passages, such that at least all of those through-passages which are open on said inlet side are closed on said outlet side; and
   porous cordierite ceramic layers deposited on portions of said partition walls, said layers extending along said partition walls from said outlet side towards said inlet side to a distance of 1/10–8/10 of an effective length of said filter, said effective length being defined by a length of said through-passages minus a thickness of said closure members.

2. A ceramic honeycomb filter as set forth in claim 1, wherein said porous ceramic layers are in direct communication with said outlet side.

* * * * *